United States Patent
Ryu et al.

(10) Patent No.: US 10,982,874 B2
(45) Date of Patent: *Apr. 20, 2021

(54) HEAT PIPE AIR-CONDITIONING APPARATUS USING BYPASS PASSAGE

(71) Applicant: NAVER Business Platform Corporation, Seongnam-si (KR)

(72) Inventors: Keunho Ryu, Seongnam-si (KR); Jeongbeom Ko, Seongnam-si (KR); Byoung Nam Choi, Seongnam-si (KR); Chang Dae Lee, Seongnam-si (KR); Deok Soo Jung, Seongnam-si (KR); Woo-jung Kim, Seongnam-si (KR)

(73) Assignee: Naver Business Platform Corporation, Seongnam-si (KR)

( * ) Notice: Subject to any disclaimer, the term of this patent is extended or adjusted under 35 U.S.C. 154(b) by 283 days.

This patent is subject to a terminal disclaimer.

(21) Appl. No.: 15/892,063

(22) Filed: Feb. 8, 2018

(65) Prior Publication Data
US 2018/0224152 A1 Aug. 9, 2018

(30) Foreign Application Priority Data
Feb. 8, 2017 (KR) ......................... 10-2017-0017588

(51) Int. Cl.
*F24F 11/30* (2018.01)
*F24F 12/00* (2006.01)
(Continued)

(52) U.S. Cl.
CPC ............ *F24F 12/002* (2013.01); *F24F 3/147* (2013.01); *F24F 6/12* (2013.01); *F24F 11/0001* (2013.01);
(Continued)

(58) Field of Classification Search
CPC .. F24F 3/147; F24F 11/30; F24F 11/70; F24F 11/74; F24F 2110/22; F24F 2110/12
See application file for complete search history.

(56) References Cited

U.S. PATENT DOCUMENTS

| 2002/0124992 A1* | 9/2002 | Rainer | F24F 11/30 165/11.1 |
| 2003/0005718 A1* | 1/2003 | Mitani | B64D 13/06 62/402 |

(Continued)

FOREIGN PATENT DOCUMENTS

| KR | 100478755 B1 | 3/2005 |
| KR | 1020100013312 A | 2/2010 |
| KR | 101103394 B1 | 1/2012 |

*Primary Examiner* — Edward F Landrum
*Assistant Examiner* — Alexis K Cox
(74) *Attorney, Agent, or Firm* — Greer Burns & Crain Ltd.

(57) ABSTRACT

An air-conditioning apparatus includes a heat pipe, which performs heat exchange. The air-conditioning apparatus provides supply air in a set state (temperature, humidity) through a change in the flow passage of ventilation air and outside air by the selective opening/shutting of dampers, cooling the outside air by spraying mist, and cooling and humidifying the supply air. The cooling temperature and humidity of the supply air is controlled at a ratio of the ventilation air passing through a cooling coil and the ventilation air passing through a bypass passage. Using a bypass passage, ventilation air can directly move to an air supply block without the intervention of the cooling coil within a heat exchange block through which a ventilation air passes.

15 Claims, 6 Drawing Sheets

(51) Int. Cl.
  *F24F 3/147* (2006.01)
  *F25B 25/00* (2006.01)
  *F28D 15/02* (2006.01)
  *F24F 11/74* (2018.01)
  *F24F 11/00* (2018.01)
  *F24F 6/12* (2006.01)
  *F24F 110/12* (2018.01)
  *F24F 110/22* (2018.01)

(52) U.S. Cl.
  CPC .......... *F24F 11/0008* (2013.01); *F24F 11/74* (2018.01); *F25B 25/005* (2013.01); *F28D 15/0275* (2013.01); *F24F 2012/005* (2013.01); *F24F 2110/12* (2018.01); *F24F 2110/22* (2018.01); *F25B 2400/13* (2013.01); *F25B 2700/2101* (2013.01); *F25B 2700/2106* (2013.01); *F28F 2250/06* (2013.01); *Y02B 30/56* (2013.01)

(56) References Cited

U.S. PATENT DOCUMENTS

| | | | | |
|---|---|---|---|---|
| 2003/0042012 | A1* | 3/2003 | Pearson | F24F 11/0001 165/210 |
| 2005/0056042 | A1* | 3/2005 | Bourne | F24F 5/0035 62/310 |
| 2005/0204914 | A1* | 9/2005 | Boutall | B01D 53/261 95/10 |
| 2007/0107450 | A1* | 5/2007 | Sasao | F24F 11/0008 62/185 |
| 2011/0079024 | A1* | 4/2011 | Hakbijl | F24F 12/003 62/56 |
| 2019/0242595 | A1* | 8/2019 | Eplee | F24F 13/20 |

* cited by examiner

HEAT PIPE AIR-CONDITIONING APPARATUS USING BYPASS PASSAGE

CROSS REFERENCE TO RELATED APPLICATION

The present application claims the benefit of Korean Patent Application No. 10-2017-0017588 filed in the Korean Intellectual Property Office on Feb. 8, 2017, 2017, the entire contents of which are incorporated herein by reference.

BACKGROUND OF THE INVENTION

The present invention relates to a heat pipe air-conditioning apparatus and, more particularly, to a heat pipe air-conditioning apparatus using a bypass passage, wherein the cooling temperature and humidity of supply air are controlled at a ratio of the ventilation air passing through a cooling coil and the ventilation air passing through a bypass passage, without passing through the cooling coil.

In general, air-conditioning has an object of making people in a house, hotel, meeting hall, office, a computer center and a variety of types of industrial facilities in a comfortable state by maintaining comfortable indoor conditions, such as temperature, humidity, scent and air current, in a state suitable for intended purposes of the place. The state of the indoor air which is comfortable for people does not have a specific value because it is influenced by several conditions, such as climate, clothing, the standard of living and the health state of the people. In order for the places, such as the workshop of a factory, a warehouse, a laboratory and a computer center, to sufficiently achieve their intended functions, the indoor air must maintain a state most suitable for things produced, processed, stored or tested in the places or a variety of types of apparatuses operating in corresponding places.

For example, air-conditioning is used so that quality of a product is uniform and defective products are not generated. For example, humidity is relatively set high in a cigarette factory so that tobacco leaves are not cut into small pieces and overly dried into powder, temperature is set low in the chocolate factory so that chocolate does not melt to lose the original shape, dust is reduced to a minimum in a semiconductor fabrication factory, and the flow of air is made slow by considering the influence the air flow on living things in the physiological laboratory.

Examples of conventional air-conditioning apparatuses used in a computer center and for a computer rack include Korean Patent Nos. 10-0478755, 10-1103394, and 10-2010-0013312.

In conventional technologies, ventilation air and outside air are cooled by a heat exchanger using a refrigerant and provided as supply air.

Such conventional technology has a problem in that a lot of energy is consumed in order to cool the outside air and the inside air.

Furthermore, conventional technology has a problem in that the humidity (relative humidity) of supplied air is not maintained unless a separate reheat heat source is configured because all of ventilated air is cooled and humidified through a cooling coil and thus resulting in relative humidity of 85~95%.

BRIEF SUMMARY OF THE INVENTION

An object of the present invention is to provide an air-conditioning apparatus using a heat pipe, which can obtain an additional cooling effect using outside air as cooling energy by heat-exchanging the outside air using a heat pipe and evaporating and cooling the outside air through a mist spray for the outside air upon performing the heat exchange of the heat pipe, can reduce energy necessary for an apparatus operation by supplying an outside air as a supply air and discharging ventilation air in a (pre-cooling) condition in which the outside air can be directly used as the supply air, can reduce use energy of the air-conditioning apparatus because the humidity of a supply air can be controlled by selectively passing or bypassing (or reheating) the supply air through a cooling coil, a structure in which the heat exchange and mixed supply of outside air and ventilation air are effectively performed is used, and energy efficiency can be improved using evaporation latent heat of water, and can reduce operation costs and make financial gains because an efficient operation can be performed in accordance with the state of the measured outside air.

A heat pipe air-conditioning apparatus according to an embodiment of the present invention includes a ventilation block providing a passage through which ventilation air (RA) introduced from indoors flows, an air exhaust block having one end connected to the ventilation block and providing a passage through which exhaust air (EA) discharged to an outside flows, an air supply block providing a passage through which a supply air (SA) supplied to the indoor flows, an outside air block having one end connected to the air supply block and providing a passage through which outside air (OA) introduced from the outside flows, a first heat exchange block including a condensation unit of a heat pipe and connected to the outside air block, the ventilation block and the air exhaust block to selectively change ventilation air through the ventilation block or outside air from the outside air block through the heat pipe into exhaust air and to discharge the changed exhaust air to the air exhaust block, a second heat exchange block including the evaporation unit of the heat pipe and connected to the ventilation block, the outside air block and the air supply block to selectively change ventilation air through the heat pipe from the ventilation block or outside air through the outside air block into supply air, to discharge the changed supply air to the air supply block, to selectively mix the ventilation air and the outside air, to change the mixed air into a supply air and to discharge the changed supply air to the air supply block, and a bypass passage disposed behind the heat pipe within the second heat exchange block and formed on one side of a cooling coil selectively cooling ventilation air to bypass a ventilation air through the heat pipe without an intervention of the cooling coil.

In this case, in an embodiment of the present invention, some of ventilation air through the second heat exchange block passes through the cooling coil and some of the ventilation air are bypassed through the bypass passage. The cooling temperature and humidity of supply air may be controlled at a ratio of the ventilation air through the cooling coil and the ventilation air through the bypass passage.

Furthermore, the ventilation block according to an embodiment of the present invention includes a first air damper disposed in a boundary between the ventilation block and the air exhaust block and selectively open and closed to control inflow of ventilation air into the air exhaust block and second air damper disposed in a boundary between the ventilation block and the second heat exchange block and selectively opened and closed to discharge a ventilation air introduced into the ventilation block to the second heat exchange block.

Furthermore, the outside air block according to an embodiment of the present invention includes a first air filter disposed in an outside air damper provided in an opening through which outside air is introduced and configured to remove an alien substance included in the outside air, a third air damper disposed in a boundary between the outside air block and the first heat exchange block and selectively opened and closed to discharge the outside air introduced into the outside air block to the first heat exchange block, a fourth air damper disposed in a boundary between the outside air block and the air exhaust block and selectively opened and closed to discharge the outside air introduced into the outside air block to discharge the air supply block, a second air filter disposed in the fourth air damper to remove an alien substance included in the outside air passing through the fourth air damper, a first temperature/humidity sensor disposed in an opening through which outside air is introduced from the outside and configured to measure a temperature and humidity of the outside air introduced from the outside to the opening, and a first temperature sensor disposed close to the third air damper to measure a temperature of the outside air after passing through the third air damper.

Furthermore, the air supply block according to an embodiment of the present invention includes a first ventilation unit disposed in the air supply block and configured to selectively control a flow velocity of supply air, a second temperature/humidity sensor disposed within the air supply block to measure a temperature and humidity of the supply air through the first ventilation unit, and a second temperature sensor disposed near the first ventilation unit to measure a temperature at an exit of the heat pipe.

Moreover, the heat pipe air-conditioning apparatus according to an embodiment of the present invention further includes a humidification nozzle provided at a front end of the air supply block to selectively spray a mist so that the supply air discharged from the second heat exchange block to the air supply block is humidified.

Furthermore, the air exhaust block according to an embodiment of the present invention further includes a second ventilation unit disposed in the air exhaust block and configured to selectively control a flow velocity of an exhaust air and a third temperature/humidity sensor disposed within the air exhaust block to measure a temperature and humidity of the exhaust air through the second ventilation unit.

Furthermore, the heat pipe air-conditioning apparatus according to an embodiment of the present invention further includes a third temperature sensor disposed near the condensation unit of the heat pipe of the first heat exchange block to measure a temperature of outside air through the heat pipe and a mist spray nozzle disposed ahead of the first heat exchange block connected to the outside air block to selectively spray a mist to outside air introduced through the outside air block.

In this case, the second heat exchange block according to an embodiment of the present invention includes a fourth temperature sensor disposed near the evaporation unit of the heat pipe to measure a temperature of ventilation air before the ventilation air passes through the heat pipe and a third air filter disposed ahead of the evaporation unit of the heat pipe to filter an alien substance included in the air passing through the heat pipe.

Moreover, a heat pipe air-conditioning apparatus according to another embodiment of the present invention includes an air supply block providing a passage through which a supply air (SA) supplied indoors flows, a ventilation blocks having a pair of ventilation air inlets disposed on left and right sides of the air supply block, respectively, to provide a passage through which a ventilation air (RA) introduced from the indoor flows, an air exhaust block disposed on one side of the ventilation block to provide a passage through which an exhaust air (EA) discharged to an outside flows, an outside air block disposed opposite the air supply block to provide a passage through which outside air (OA) introduced from the outside flows, a first heat exchange block including a condensation unit of a heat pipe and connected to the outside air block and the air exhaust block to change the outside air introduced through the outside air block into exhaust air by passing the outside air through the heat pipe, and to discharge the changed exhaust air to the air exhaust block, and a second heat exchange block including the evaporation unit of the heat pipe and connected to the ventilation block and the air supply block to change the ventilation air introduced through the ventilation block into the supply air by passing the ventilation air through the heat pipe, and to discharge the changed supply air to the air supply block, wherein a bypass passage is formed on one side of a cooling coil disposed behind the heat pipe within the second heat exchange block to selectively cool a supply air and bypasses a supply air through the heat pipe without an intervention of the cooling coil.

In this case, in the heat pipe air-conditioning apparatus according to another embodiment of the present invention, some of the supply air through the second heat exchange block passes through the cooling coil and some of the supply air are bypassed through the bypass passage. The cooling temperature and humidity of the supply air may be controlled at a ratio of a supply air through the cooling coil and the supply air through the bypass passage.

Furthermore, the ventilation block according to another embodiment of the present invention includes a first air damper disposed in a boundary line of the ventilation block and the air exhaust block and selectively opened and shut to discharge a ventilation air flowing into the ventilation block to the air exhaust block, a second air damper disposed in the ventilation block and selectively opened and shut to discharge the ventilation air flowing into the ventilation block to the second heat exchange block, a first air volume measurement sensor disposed within the ventilation block to measure an air volume within the ventilation block, and a first ventilation unit disposed within the ventilation block to selectively control an air volume within the ventilation block.

Furthermore, the outside air block according to another embodiment of the present invention includes a first air filter disposed in an outside air damper disposed in an opening through which an outside air is introduced to remove an alien substance included in the outside air, second ventilation unit disposed within the outside air block to selectively control an air volume of exhaust air, a fourth air damper disposed in a boundary between the outside air block and the air supply block and selectively opened and shut to discharge the outside air flowing into the outside air block to the air supply block, a second air filter disposed in the fourth air damper to remove an alien substance included in the outside air through the fourth air damper, and a first temperature/humidity sensor disposed in an opening through which outside air is introduced from the outside to measure a temperature and humidity of the outside air introduced through the opening from the outside.

Moreover, the first heat exchange block according to another embodiment of the present invention includes a third air damper disposed in a boundary between the outside air block and the first heat exchange block and selectively opened and shut to discharge outside air flowing into the outside air block to the first heat exchange block and a first temperature sensor disposed close to the third air damper to measure a temperature of outside air after the outside air passes through the third air damper.

Furthermore, the second heat exchange block according to another embodiment of the present invention includes a third air filter disposed ahead of the evaporation unit of the heat pipe to filter an alien substance included in air passing through the heat pipe, a cooling coil disposed behind the evaporation unit of the heat pipe to selectively cool ventilation air through the heat pipe, and a humidifier disposed behind the cooling coil to selectively humidify air drained to the air supply block depending on a setting state.

DETAILED DESCRIPTION OF THE INVENTION

Figure 1:
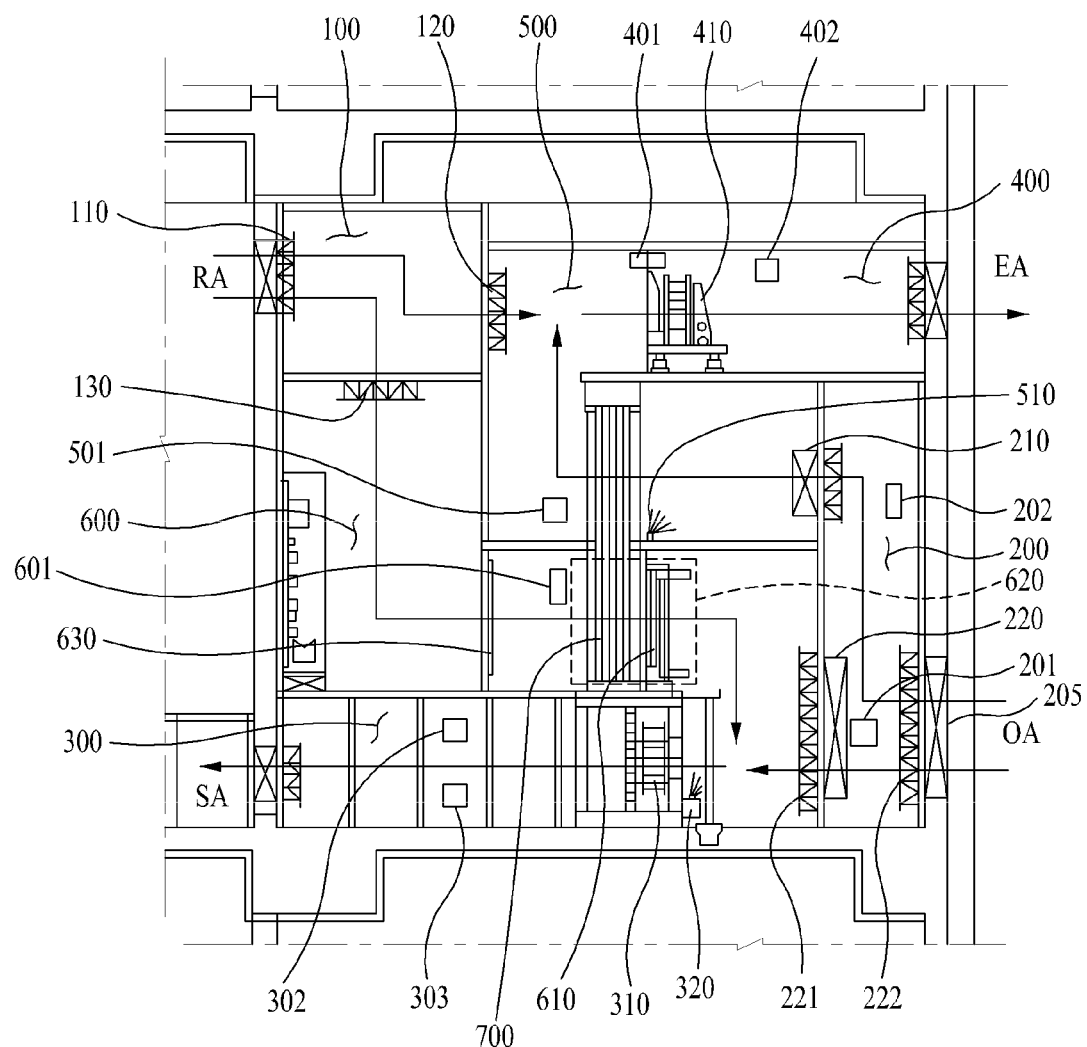
FIG. 1 shows an example of a cross-sectional view of a heat pipe air-conditioning apparatus using a bypass passage according to an embodiment of the present invention.

Hereinafter, embodiments of the present invention are described in detail below with reference to the accompanying drawings. Terms or words used in the specification and claims should be construed as having meanings and concepts that comply with the technological spirit of the present invention based on the principle that an inventor may appropriately define the concept of a term in order to describe his or her invention in the best manner.

Accordingly, configurations described in the embodiments of this specification and shown in the drawings are exemplary embodiments of the present invention and represent the technological spirit of the present invention. Accordingly, it would be understood that a variety of equivalents and modifications which may substitute the embodiments at the time of filing of this application may be present.

First, a heat pipe includes a container in a pipe form, a wick (i.e., metal wick structure) embedded in the container, and an operating fluid. The wick is a porous structure capable of generating a capillary force.

The inside of the heat pipe is sealed to maintain a vacuum state. A sealed operating fluid is easily evaporated in a low temperature. When heat is applied to the evaporation unit (one end) of the heat pipe, the operating fluid has pressure higher than that in a condensation unit (the other end) because it absorbs surrounding heat and evaporates. Accordingly, the operating fluid moves to the condensation unit due to a pressure difference between the evaporation unit and the condensation unit. The operating fluid in the condensation unit discharges heat to the surroundings, condenses, and thus has low pressure. As a result, the operating fluid moves to the evaporation unit again.

Accordingly, the heat pipe is divided into an evaporation unit (one end), a condensation unit (the other end), and an insulation part (or intermediate part) between the evaporation unit and the condensation unit. The evaporation unit of the heat pipe absorbs heat from a heat source, and performs a cooling function of absorbing heat from the surroundings as the operating fluid evaporates into a gaseous state. In contrast, the condensation unit performs a heating function of discharging heat as the operating fluid condenses.

Furthermore, the heat pipe is a heat exchanger in which a heat transfer medium (i.e., operating fluid) can move due to a pressure difference between the evaporation unit and the condensation unit in a phase change process, such as the evaporation and condensation of the operating fluid and thus the absorption (or cooling) and discharge (or heating) process of heat are consecutively performed without a separate power source.

The present invention relates to an air-conditioning apparatus using a heat pipe and to a heat pipe air-conditioning apparatus using a bypass passage, wherein a cooling temperature and humidity of supply air are controlled at a ratio of ventilation air passing through a cooling coil and ventilation air passing through a bypass passage using the bypass passage through which the ventilation air can directly move to an air supply block without passing through the cooling coil within a second heat exchange block through which the ventilation air passes. The air-conditioning apparatus is described below with reference to the accompanying drawings.

Referring to FIG. 1, a heat pipe air-conditioning apparatus 10 using a bypass passage according to an embodiment of the present invention includes a ventilation block 100, an outside air block 200, an air supply block 300, an air exhaust block 400, a first heat exchange block 500 and a second heat exchange block 600. (In the present invention, one side and the other side or the front and the back indicative of directions are described based on the direction in which a fluid moves. The direction in which a fluid is introduced is one side or the front and the direction in which a fluid is drained (or discharged) is the other side or the back.)

First, the ventilation block 100 provides a passage through which a ventilation air introduced from the inside of a structure to be cooled (not shown) flows from one side to the other side of the ventilation block 100. One side of the ventilation block 100 is connected to the structure in such a way as to communicate with the inside of the structure so that the ventilation air is introduced into the air-conditioning apparatus 10 from inside of the structure, and the other side of the ventilation block 100 is connected to the first heat exchange block 500 and the second heat exchange block 600 in such a way as to communicate with them so that the ventilation air is drained into the first heat exchange block 500 and the second heat exchange block 600.

The ventilation block 100 is equipped with a plurality of air dampers controlling the flow of the ventilation air. A first air damper 120 is disposed in an opening in a boundary or wall between the ventilation block 100 and the air exhaust block 400, and enables the ventilation block 100 and the air exhaust block 400 to communicate with each other. Ventilation air that flows from indoors to the ventilation block 100 is selectively drained into the air exhaust block 400 directly by the selective opening/closing of the first air damper 120.

Furthermore, a second air damper 130 is disposed in an opening in a boundary or wall between the ventilation block 100 and the second heat exchange block 600, and enables the ventilation block 100 and the second heat exchange block 600 to communicate with each other. Ventilation air introduced from indoors to the ventilation block 100 is selectively drained into the second heat exchange block 600 by the selective opening and closing of the second air damper 130.

Furthermore, the outside air block 200 provides a passage through which outside air introduced from the outside through an outside air damper 205 flows from one side to the other side of the outside air block 200. One side of the outside air block 200 is connected to the outside air damper 205 in such a way as to communicate therewith so that the outside air is introduced into the air-conditioning apparatus 10, and the other side thereof is connected to the first heat exchange block 500 and the air supply block 300 in such a way as to communicate with them so that the introduced outside air is drained into the first heat exchange block 500 and the air supply block 300.

A third air damper 210 is disposed in an opening in a boundary or wall between the outside air block 200 and the first heat exchange block 500, and enables the outside air block 200 and the first heat exchange block 500 to communicate with each other. Outside air introduced from the outside to the outside air block 200 is selectively drained from the outside air block 200 into the first heat exchange block 500 by the selective opening and closing of the third air damper 210.

Furthermore, a fourth air damper 220 is disposed in an opening in a boundary or wall between the outside air block 200 and the air supply block 300, and enables the outside air block 200 and the air supply block 300 to communicate with each other. Outside air introduced from the outside to the outside air block 200 is selectively drained from the outside air block 200 to the air supply block 300 by the selective opening and closing of the fourth air damper 220.

The outside air damper 205 includes a first air filter 222, and the fourth air damper 220 includes a second air filter 221. The first air filter 222 removes alien substances (dust, etc.) included in an outside air that flows from the outside air block 200 to the second heat exchange block 600 by filtering the outside air. The second air filter 221 secondarily filters the air primarily filtered by the first air filter 222 and sends the filtered air to the supply air block 300.

The first air filter 222 of the outside air damper 205 performs a pre-filter function, and the second air filter 221 performs a medium filter function.

Furthermore, a first temperature/humidity sensor 201 is disposed in an opening in the outside wall of the outside air block 200, and measures the temperature and humidity of outside air introduced from the outside of the air-conditioning apparatus 10 into the outside air block 200. A first temperature sensor 202 is disposed inside the outside air block 200 close to and upstream of the third air damper 210, and measures the temperature of an outside air being drained into the first heat exchange block 500 through the third air damper 210.

The air supply block 300 provides a passage through which a supply air supplied indoors flows. One side of the air supply block 300 is connected to the second heat exchange block 600 and the outside air block 200 in such a way as to communicate with them, so the supply air changed from the ventilation air through the second heat exchange block 600 can be introduced into the air supply block 300 and/or outside air is directly introduced into the air supply block 300 through the outside air block 200. The other side of the air supply block 300 is connected to the structure to be cooled in such a way as to communicate with the inside of the structure, so supply air introduced from the second heat exchange block 600 is guided and supplied indoors (inside of the structure to be cooled).

A first ventilation unit 310, such as a ventilation fan, is provided within the air supply block 300. The driving and rotation speed of the first ventilation unit 310 are selectively controlled to adjust the air volume of supply air supplied indoors from the air supply block 300. A humidifier 320 is provided at the front end (upstream) of the air supply block 300 so that the supply air drained from the second heat exchange block 600 to the air supply block 300 is selectively humidified.

Furthermore, a first air volume measurement sensor 301 is provided within the air supply block 300. The first air volume measurement sensor 301 measures an air volume within the air supply block 300.

Furthermore, a second temperature/humidity sensor 302 is provided within the air supply block 300. The second temperature/humidity sensor 302 measures the temperature and humidity of supply air through the first ventilation unit 310. A second temperature sensor 303 is provided behind (downstream) the first ventilation unit 310, and measures temperature of air that has passed through the heat pipe.

The air exhaust block 400 provides a passage through which exhaust air discharged from inside the air-conditioning apparatus 10 to the outside flows. One side of the air exhaust block 400 is connected to the ventilation block 100 and the first heat exchange block 500 in such a way as to communicate with them, so that exhaust air from the ventilation block 100 and the first heat exchange block 500 is introduced into the air exhaust block 400. The other side of the air exhaust block 400 is connected to the outside in such a way as to communicate with the outside, so that the exhaust air introduced from the ventilation block 100 and the first heat exchange block 500 is guided and discharged to the outside.

The air exhaust block 400 also includes a second ventilation unit 410, such as an exhaust fan, provided therein. The driving and rotation speed of the second ventilation unit 410 are selectively controlled to adjust the air volume of an exhaust air discharged from the air exhaust block 400 to the outside.

Furthermore, a second air volume measurement sensor 401 is provided within the air exhaust block 400. The second air volume measurement sensor 401 measures the air volume within the air exhaust block 400.

Furthermore, a third temperature/humidity sensor 402 is provided behind (downstream) the second ventilation unit 410. The third temperature/humidity sensor 402 measures the temperature and humidity of the exhaust air passing through the second ventilation unit 410.

In an embodiment of the present invention, the first heat exchange block 500 and second heat exchange block 600 of the heat pipe air-conditioning apparatus 10 using a bypass passage are provided in a stack form and share a heat pipe 700. The first heat exchange block 500 contains the upper side of the heat pipe 700, and the second heat exchange block 600 contains the lower side of the heat pipe 700. The heat pipe 700 is vertically located in an upright form at the center of the first heat exchange block 500 and the second heat exchange block 600 that are stacked up and down.

The heat pipe 700 enables the consecutive absorption (cooling) and discharge (heating) process of heat without a separate power source because a heat transfer medium (e.g., operating fluid) can flow due to a pressure difference between the evaporation unit and the condensation unit in a phase change process, such as the evaporation and condensation of the operating fluid.

The first heat exchange block 500 containing the upper side of the heat pipe 700 includes the condensation unit (the upper end) of the heat pipe 700. One side of the first heat exchange block 500 to which outside air is introduced is connected to the outside air block 200, and the opposite side is connected to the ventilation block 100 and the air exhaust block 400.

In an embodiment of the present invention, the heat pipe 700 has been illustrated as including the condensation unit within the first heat exchange block 500, but the present invention is not limited thereto. For example, the heat pipe 700 may include an evaporation unit within the first heat exchange block 500.

The first heat exchange block 500 selectively guides ventilation air through the ventilation block 100 and outside air (or exhaust air) through the heat pipe 700 from the outside air block 200 into the air exhaust block 400 so that the ventilation air or the outside air flows through the air exhaust block 400.

A third temperature sensor 501 is disposed in the condensation unit (the upper end) of the heat pipe 700 of the first heat exchange block 500, and measures temperature of the outside air that has passed through the heat pipe 700.

Furthermore, a mist spray nozzle 510 is provided ahead (upstream) of the first heat exchange block 500 connected to the outside air block 200. The mist spray nozzle 510 selectively sprays mist to the outside air introduced through the outside air block 200 so that the outside air is cooled by the evaporation latent heat phenomenon of the mist.

Furthermore, the second heat exchange block 600 containing the lower side of the heat pipe 700 includes the lower piece of the heat pipe 700. One side of the second heat exchange block 600 into which ventilation air is introduced is connected to the ventilation block 100, and the other side opposite one side is connected to the outside air block 200 and the air supply block 300.

In an embodiment of the present invention, the heat pipe 700 has been illustrated as including the evaporation unit within the second heat exchange block 600, but the present invention is not limited thereto. For example, the heat pipe 700 may include a condensation unit within the second heat exchange block 600.

The second heat exchange block 600 selectively changes ventilation air through the heat pipe 700 from the ventilation block 100 or an outside air through the outside air block 200 into a supply air, and guides the changed supply air so that it flows into the air supply block 300.

Moreover, the second heat exchange block 600 selectively enables ventilation air and outside air to be introduced thereto from the ventilation block 100 and the outside air block 200, respectively, at the same time. The second heat exchange block 600 mixes the ventilation air and the outside air, changes the mixed air into supply air, and guides the changed supply air so that it flows into the air supply block 300.

Furthermore, a fourth temperature sensor 601 is disposed near the evaporation unit of the heat pipe 700 (the lower end) within the second heat exchange block 600, and measures the temperature of ventilation air before it passes through the heat pipe 700.

Furthermore, a cooling coil 610 is provided behind (downstream) the evaporation unit (the lower end) of the heat pipe 700 of the second heat exchange block 600. The cooling coil 610 selectively cools the ventilation air (or supply air) that passes through the heat pipe 700.

A third air filter 630 is disposed ahead of the evaporation unit (the lower end) of the heat pipe 700 within the second heat exchange block 600. The third air filter 630 removes alien substances (dust, etc.) included in ventilation air that is introduced through the ventilation block 100 and moves within the second heat exchange block 600 by filtering the ventilation air.

Figure 2:
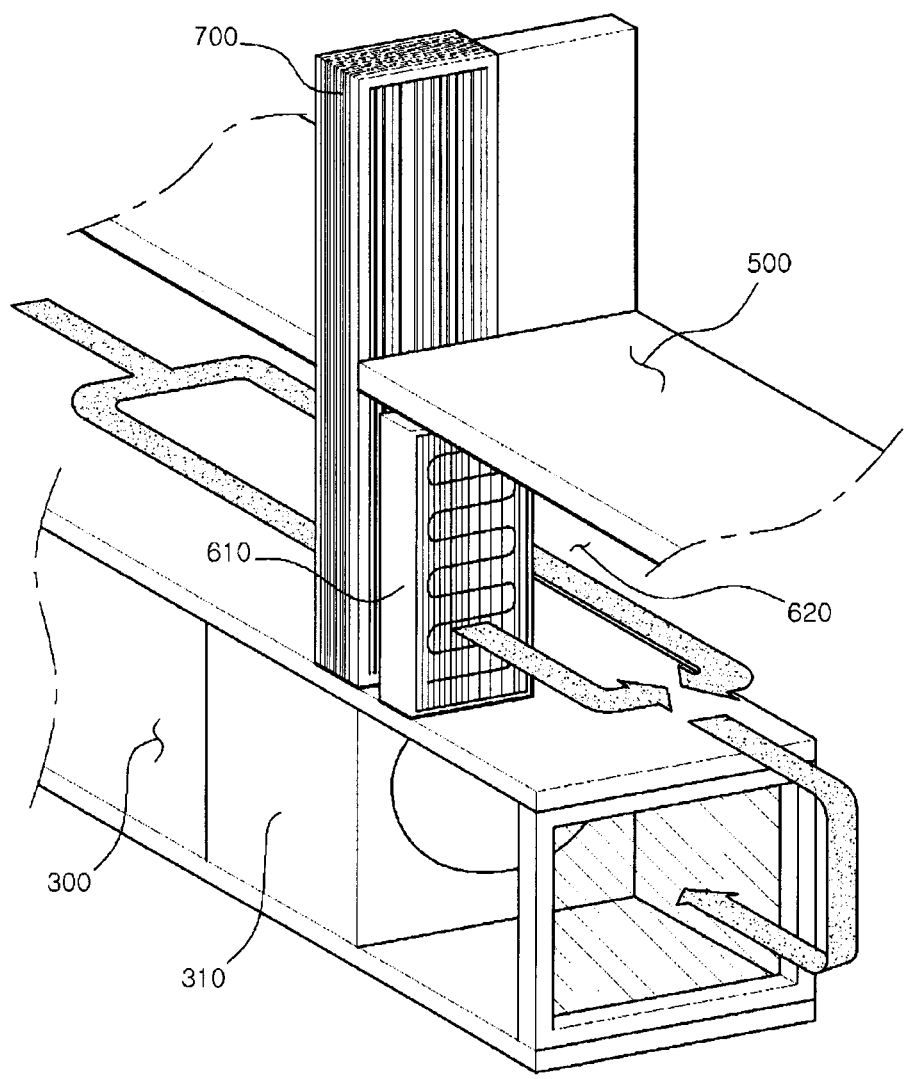
FIG. 2 shows an example of the bypass passage of the heat pipe air-conditioning apparatus according to an embodiment of the present invention.
Figure 3:
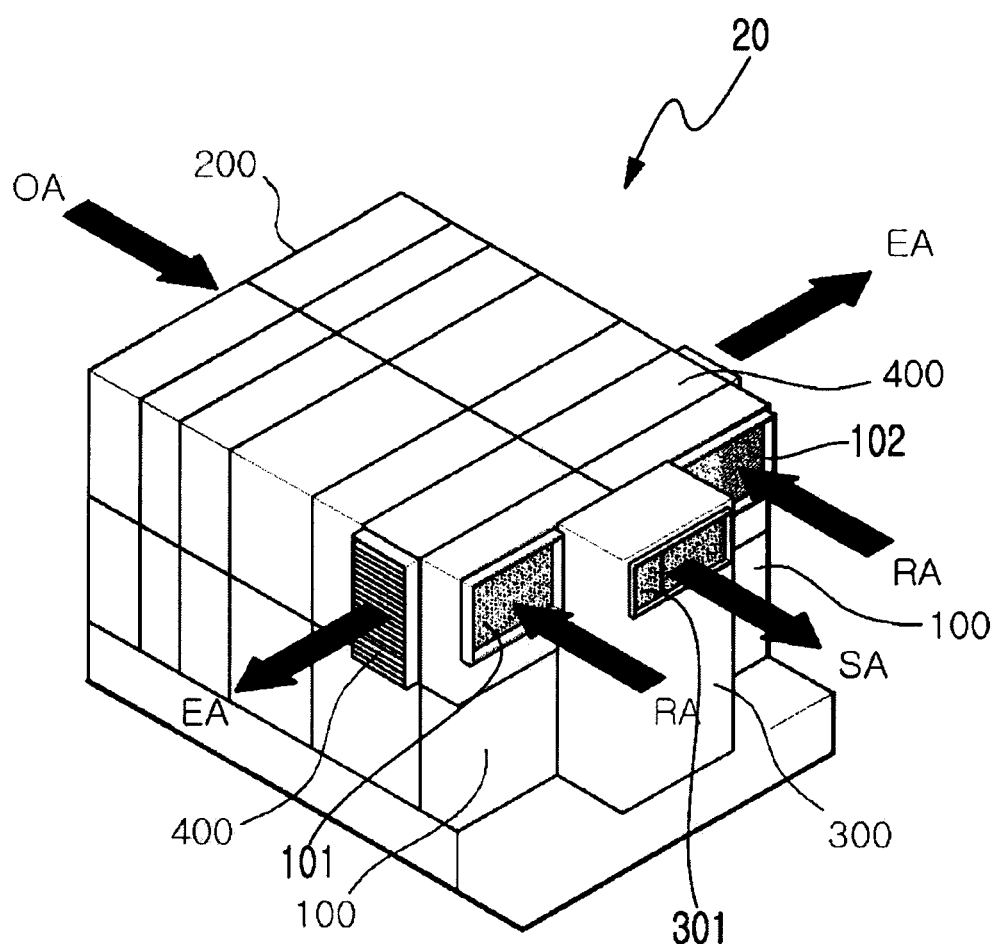
FIG. 3 is a perspective view of a heat pipe air-conditioning apparatus using a bypass passage according to another embodiment of the present invention.

As shown in FIG. 2, a bypass passage 620 is disposed on one side of the cooling coil 610 that is disposed behind (downstream) the evaporation unit (the lower end) of the heat pipe 700 within the second heat exchange block 600 and that cools the ventilation air as it passes through the cooling coil 610. The bypass passage 620 allows some of the ventilation air that passed through the heat pipe 700 to flow around the cooling coil 610, i.e., bypass the cooling coil, so that the ventilation air does not flow through the cooling coil 610.

An opening/closing door (not shown) is disposed at the front end (upstream) of the bypass passage 620, and may control the amount of flow of the ventilation air passing through the bypass passage 620 by controlling the degree of the opening of the bypass passage 620 using a drive motor (not shown). The operation of the door (the adjustment of the door) may be based on the measurements from the second temperature/humidity sensor 302. The opening/closing door may be operated to appropriately control the cooling temperature and humidity of supply air at a desired ratio of the ventilation air passing through the cooling coil 610 and the ventilation air passing through the bypass passage 620. In this manner, the humidity (relative humidity) of supplied air may be consistently maintained even without a separate reheat heat source. Furthermore, the desired temperature and humidity may be maintained although an indoor partial load is generated and/or humidity rises due to indoor infiltration by appropriately operating the door.

Furthermore, in FIG. 2, the bypass passage 620 has been illustrated as being formed on one side of the cooling coil 610, but the present invention is not limited thereto. The bypass passage may be formed at various locations and in various forms depending on the structure of the air-conditioning apparatus.

Accordingly, the cooling temperature and humidity of supply air is controlled at a ratio of the ventilation air passing through the cooling coil and the ventilation air passing through the bypass passage 620. Accordingly, the humidity (relative humidity) of supplied air can be consistently maintained even without a separate reheat heat source. Furthermore, supply air can maintain a desired temperature and humidity although an indoor partial load is generated and humidity rises due to indoor infiltration.

The heat pipe air-conditioning apparatus 10 using a bypass passage according to an embodiment of the present invention operates in any one of a ventilation air operation mode in which only ventilation air is selectively changed into supply air a temperature (dry-bulb temperature) and wet-bulb temperature of outside air and a temperature of a ventilation air and supply air, a mixed operation mode in which ventilation air and outside air are mixed, changed into supply air and supplied indoors, and a full outside air operation mode in which only outside air is changed into supply air and supplied indoors.

The operation mode of the air-conditioning apparatus 10 is described in more detail with reference to FIG. 1. The ventilation air operation mode is an air-conditioning operation mode in which only the ventilation air circulates through the air-conditioning apparatus 10 and resupplied indoors. In this mode, the second air damper 130 of the ventilation block 100 is open, so the ventilation air flows from indoors to the second heat exchange block 600 along the ventilation block 100. At this time, the first air damper 120 of the ventilation block 100 is closed so that all of the ventilation air flowing from indoors to the ventilation block 100 flows into the second heat exchange block 600.

Furthermore, in the outside air block 200, the fourth air damper 220 is closed and the third air damper 210 is open, so the outside air flows from the outside to the first heat exchange block 500 along the outside air block 200.

At this time, before the outside air passes through the first heat exchange block 500, it is cooled by the evaporation latent heat phenomenon of mist sprayed by the mist spray nozzle 510 and passes through the first heat exchange block 500.

In this case, the ventilation air through the second heat exchange block 600 and the outside air through the first heat exchange block 500 are indirectly heat-exchanged by the heat pipe 700 while passing through the heat pipe 700. The ventilation air through the second heat exchange block 600 passes through the evaporation unit (the lower end) of the heat pipe 700. The outside air through the first heat exchange block 500 passes through the condensation unit (the upper end) of the heat pipe 700. The ventilation air through the evaporation unit (lower end) of the heat pipe 700 is cooled by the evaporation unit through the heat pipe 700 because the heat of the ventilation air is deprived by the evaporation of the operating fluid and is changed into supply air. The changed supply air is supplied from the second heat exchange block 600 to the indoor through the air supply block 300.

At this time, the ventilation air passing through the evaporation unit (the lower end) of the heat pipe 700 also passes through the cooling coil 610. The cooling coil 610 may selectively operate depending on the set supply air temperature and cool the supply air, or the humidifier 320 may selectively operate depending on the set supply air humidity and humidify the supply air. The set supply air temperature and humidity may be a desired reference value predetermined by a user based on the use condition or the use environment of the air-conditioning apparatus 10.

Furthermore, the exhaust air changed from an outside air by the condensation unit (the upper end) of the heat pipe 700 from the first heat exchange block 500 flows into the air exhaust block 400 and is discharged to the outside along the air exhaust block 400.

In the ventilation air operation mode, the mist spray nozzle 510 and the cooling coil 610 may be driven in response to the set or predetermined temperature of the supply air in comparison with the outside air and/or the ventilation air.

Furthermore, the mixed operation mode is an air-conditioning operation mode in which ventilation air and outside air are mixed, changed into supply air and supplied indoors. The first air damper 120 and second air damper 130 of the ventilation block 100 are open, so the ventilation air flows from indoors to the second heat exchange block 600 and the air exhaust block 400 along the ventilation block 100. In this case, the amount of degree of opening of the first air damper 120 and the second air damper 130 is controlled depending on the outside air temperature. The first air damper 120 adjusts the volume of the exhaust air (EA), and the second air damper 120 adjusts the volume of the ventilation air (RA) to be mixed with the outside air (OA). Thus, the mixed amount/ratio of the ventilation air (RA) and the outside air (OA) may be adjusted by controlling the degree of opening of the first air damper 120 and the second air damper 130 based on the outside air temperature (and the ventilation air temperature).

Furthermore, in the outside air block 200, the fourth air damper 220 is open, so an outside air flows from the outside to the air supply block 300 along the outside air block. At this time, the degree of opening of the fourth air damper 220 is controlled depending on the state of the outside air. The outside air flowing into the air supply block 300 passes through the fourth air damper 220 and is mixed with the ventilation air flowing out of the second heat exchange block 600 and supplied indoors through the air supply block 300.

Furthermore, the exhaust air changed from the outside air drained from the first heat exchange block 500, if any, flows into the air exhaust block 400 and is discharged to the outside along the air exhaust block 400.

In the mixed operation mode, the mist spray nozzle 510 is driven and the cooling coil 610 is not driven so that the outside air is cooled when outside air wet-bulb temperature<set temperature.

Furthermore, the full outside air operation mode is an air-conditioning operation mode in which only outside air is changed into supply air and the changed supply air is supplied indoors. The first air damper 120 of the ventilation block 100 is open and the second air damper 130 thereof is closed. Accordingly, ventilation air flows from indoors to the air exhaust block 400 along the ventilation block 100. The ventilation air flowing into the air exhaust block 400 is changed into exhaust air and discharged to the outside along the air exhaust block 400.

Furthermore, in the outside air block 200, the third air damper 210 is closed and the fourth air damper 220 is open, so the outside air flows from the outside to the air supply block 300 along the outside air block 200.

At this time, the outside air that flowed into the air supply block 300 is changed into supply air, and the changed supply air is supplied indoors through the air supply block 300.

The full outside air operation mode is a pre-cooling mode using the outside air. In this mode, the mist spray nozzle 510 and the cooling coil 610 are not driven.

An air-conditioning apparatus 20 using a heat pipe according to another embodiment of the present invention, as shown in FIGS. 3 to 6, includes the ventilation block 100, the outside air block 200, the air supply block 300, the air exhaust block 400, the first heat exchange block 500 and the second heat exchange block 600. (In the present invention, one side and the other side or the front and the back indicative of directions are described based on the direction in which a fluid moves. The direction in which a fluid is introduced is one side or the front and the direction in which a fluid is drained (or discharged) is the other side or the back.)

First, the ventilation block 100 provides a passage through ventilation air introduced from the indoor moves from one side to the other side, and includes a pair of left and right ventilation blocks of the ventilation block 100. The ventilation block 100 includes a pair of ventilation air inlets 101, 102, one each on the left and right sides of the air supply block 300. One side of the ventilation block 100 having the ventilation air inlets 101, 102 is connected to the structure to be cooled in such a way as to communicate with the inside of the structure so that ventilation air is introduced into the ventilation block 100 through the ventilation air inlets 101, 102. The other side of the ventilation block 100 is connected to the second heat exchange block 600 and the air exhaust block 400 in such a way as to communicate with them so that ventilation air is drained to the second heat exchange block 600 and the air exhaust block 400.

The ventilation block 100 is equipped with a plurality of air dampers that controls the flow of the ventilation air. The first air damper 120 is disposed in an opening in a boundary or wall between the ventilation block 100 and the air exhaust block 400, and enables the ventilation block 100 and the air exhaust block 400 to communicate with each other. The ventilation air introduced from indoors to the ventilation block 100 is selectively drained to the ventilation block 100 and the air exhaust block 400 directly by the selective opening and closing of the first air damper 120.

Furthermore, the second air damper 130 is disposed in an opening on a boundary or wall between the ventilation block 100 and the second heat exchange block 600, and enable the ventilation block 100 and the second heat exchange block 600 to communicate with each other. The ventilation air introduced from indoors to the ventilation block 100 is selectively drained to the ventilation block 100 and the second heat exchange block 600 by the selective opening and closing of the second air damper 130.

Furthermore, the ventilation block 100 includes the first ventilation unit 310 and the first air volume measurement sensor 301 for measuring the air volume within the ventilation block 100. The driving and rotation speed of the first ventilation unit 310 are selectively controlled based on the measurements from the first air volume measurement sensor 301, so the volume of supply air provided indoors from the ventilation block 100 is controlled. The first air volume measurement sensor 301 measures the air volume within the ventilation block 100.

Moreover, the outside air block 200 provides a passage through which an outside air introduced from the outside through the outside air damper 205 flows from one side to the other side of the outside air block 200. One side of the outside air block 200 is connected to the outside air damper 205 in such a way as to communicate with the outside air damper so that the outside air is introduced into the outside air block 200. The other side of the outside air block 200 is connected to the first heat exchange block 500 and the air supply block 300 in such a way as to communicate with them so that the outside air is drained into the first heat exchange block 500 and the air supply block 300.

The second ventilation unit 410 is provided within the outside air block 200. The driving and rotation speed of the second ventilation unit 410 are selectively controlled, so the volume of outside air discharged from the outside air block 400 is controlled.

Furthermore, the fourth air damper 220 is disposed in an opening in a boundary or wall between the outside air block 200 and the air supply block 300, and enables the outside air block 200 and the air supply block 300 to communicate with each other. The outside air introduced from the outside to the outside air block 200 is selectively drained from the outside air block 200 to the air supply block 300 by the selective opening and closing of the fourth air damper 220.

Furthermore, a first air filter 222 is disposed in the outside air damper, and a second air filter 221 is disposed in the fourth air damper 220. The first air filter 222 removes alien substances (e.g., dust) included in an outside air introduced from the outside air block 200 to the first heat exchange block 500 by filtering the alien substances. The second air filter 221 secondarily filters the air primarily filtered by the first air filter 222, and forwards the filtered air to the air supply block 300.

In this case, the first air filter 222 disposed in the outside air damper 205 performs a pre-filter function, and the second air filter 221 performs a medium filter function.

Furthermore, the first temperature/humidity sensor 201 is disposed in an opening in the outside wall of the outside air block 200, and measures the temperature and humidity of outside air introduced from the outside to the outside air block 200.

The air supply block 300 provides a passage through supply air supplied indoors flows. One side of the air supply block 300 is connected to the second heat exchange block 600 and the outside air block 200 in such a way as to communicate with them. The passage extends along the bottom of the air-conditioning apparatus 20. A supply air exit 301 from which a supply air is discharged is located between the pair of ventilation air inlets 101, 102 of the ventilation blocks 100. The supply air changed from ventilation air through the second heat exchange block 600 is introduced into the supply block 300 (See FIG. 4) or outside air through the outside air block 200 is directly introduced into the air supply block 300 (See FIG. 5). The supply air exit 301 of the air supply block 300 is connected to the structure to be cooled in such a way as to communicate with the inside of the structure, so the supply air introduced from the second heat exchange block 600 and the outside air block 200 is guided and supplied to the indoor.

Furthermore, the air exhaust block 400 provides a passage through which the exhaust air discharged to the outside flows. One side of the air exhaust block 400 is connected to the ventilation block 100 and the first heat exchange block 500 in such a way as to communicate with them, so that the exhaust air passing through the ventilation block 100 and the first heat exchange block 500 enters the air exhaust block 400. The other side of the air exhaust block 400 is connected to the outside in such a way as to communicate with the outside, so that the exhaust air introduced from the ventilation block 100 and the first heat exchange block 500 is guided into the outside and discharged.

The first heat exchange block 500 and the second heat exchange block 600 of the air-conditioning apparatus 20 are disposed in a stack form and share the heat pipe 700. The first heat exchange block 500 contains the upper side of the heat pipe 700, the second heat exchange block 600 contains the lower side of the heat pipe 700, and the heat pipe 700 is disposed in a form that is upright at the center of the first heat exchange block 500 and the second heat exchange block 600 of the up and down stacked form.

The heat pipe 700 enables the consecutive absorption (cooling) and discharge (heating) process of heat without a separate power source because the heat transfer medium (e.g., operating fluid) can flow due to the pressure difference between the evaporation unit and the condensation unit in a phase change process, such as the evaporation and condensation of the operating fluid.

The first heat exchange block 500 containing the upper side of the heat pipe 700 includes the condensation unit (the upper end) of the heat pipe 700. One side of the first heat exchange block 500 to which an outside air is introduced is connected to the outside air block 200, and the opposite side is connected to the ventilation block 100 and the air exhaust block 400.

In an embodiment of the present invention, the heat pipe 700 has been illustrated as including the condensation unit within the first heat exchange block 500, but the present invention is not limited thereto. For example, the heat pipe 700 may include an evaporation unit within the first heat exchange block 500.

The first heat exchange block 500 includes the third air damper 210 in an opening in a boundary or wall between the first exchange block 500 and the outside air block 200. The third air damper 210 enables the first exchange block 500 and the outside air block 200 to communicate with each other. The outside air introduced from the outside to the outside air block 200 is selectively drained from the outside air block 200 to the first heat exchange block 500 by the selective opening and closing of the third air damper 210. The first temperature sensor 202 is disposed inside the first heat exchange block 500 close to the third air damper 210, and measures the temperature of the outside air drained into the first heat exchange block 500 through the third air damper 210.

Accordingly, the first heat exchange block 500 selectively guides the outside air through the heat pipe 700 so that the outside air flows from the outside air block 200 to the air exhaust block 400 as exhaust air.

The third temperature sensor 501 is disposed in the air exhaust block 400, and measures temperature of the outside air that has passed through the heat pipe 700.

Furthermore, the mist spray nozzle 510 is provided ahead of the first heat exchange block 500 connected to the outside air block 200. The mist spray nozzle 510 selectively sprays mist to the outside air introduced through the outside air block 200 so that the outside air is cooled by the evaporation latent heat phenomenon of the mist.

Furthermore, the second heat exchange block 600 disposed on the lower side of the heat pipe 700 includes the lower piece of the heat pipe 700. One side of the second heat exchange block 600 into which a ventilation air is introduced is connected to the ventilation block 100, and the opposite side is connected the air supply block 300.

In an embodiment of the present invention, the heat pipe 700 has been illustrated as including the evaporation unit within the second heat exchange block 600, but the present invention is not limited thereto. For example, the heat pipe 700 may include a condensation unit within the second heat exchange block 600.

The second heat exchange block 600 selectively changes ventilation air through the heat pipe 700 from the ventilation block 100 into supply air, and guides the changed supply air so that it flows into the air supply block 300.

Furthermore, the cooling coil 610 is provided behind (downstream) the evaporation unit (the lower end) of the heat pipe 700. The cooling coil 610 selectively cools the ventilation air passing through the heat pipe 700.

In this case, the third air filter 630 is disposed ahead (upstream) of the evaporation unit (the lower end) of the heat pipe 700 disposed within the second heat exchange block 600. The third air filter 630 removes alien substances (dust, etc.) included in ventilation air that is introduced through the ventilation block 100 and that flows into the second heat exchange block 600 by filtering the ventilation air.

Furthermore, the humidifier 320 is provided behind (downstream) the cooling coil 610, and selectively humidifies the supply air drained from the second heat exchange block 600 to the air supply block 300.

Furthermore, the bypass passage 620 described above with respect to FIGS. 1 and 2 is also provided in the embodiment of the present invention described with respect to FIGS. 3-6. In FIGS. 3-6, the bypass passage 620 is also formed on one side of the cooling coil 610 that is disposed behind the evaporation unit (the lower end) of the heat pipe 700 within the second heat exchange block 600 and that cools the supply air. The bypass passage 620 allows some of the ventilation air that passed through the heat pipe 700 to flow around the cooling coil 610, i.e., bypass the cooling coil, so that the ventilation air does not flow through the cooling coil 610.

The opening/closing door (not shown) is disposed ahead (upstream) of the bypass passage 620. The amount of flow of the ventilation air through the bypass passage 620 can be controlled by the opening and closing of the bypass passage 620 to the desired degree using a drive motor on the opening/closing door. The opening/closing door may be operated to appropriately control the cooling temperature and humidity of supply air at a desired ratio of the ventilation air passing through the cooling coil 610 and the ventilation air passing through the bypass passage 620. In this manner, the humidity (relative humidity) of supplied air may be consistently maintained even without a separate reheat heat source. Furthermore, the desired temperature and humidity may be maintained although an indoor partial load is generated and/or humidity rises due to indoor infiltration by appropriately operating the door.

Figure 4:
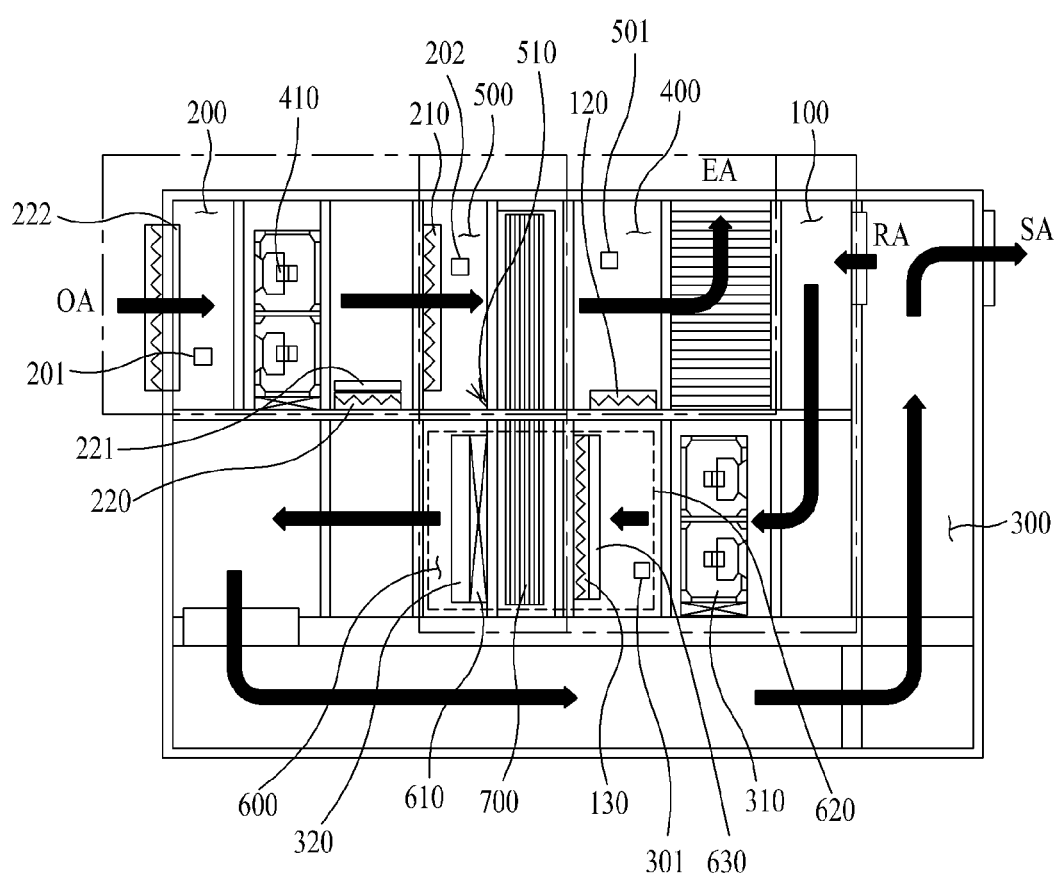
FIG. 4 is an exemplary diagram showing a flow of air through the air-conditioning apparatus of FIG. 3 in a heat pipe (heat exchange) operation mode according to an embodiment of the present invention.

FIG. 4 shows a flow of air through the air-conditioning apparatus 20 in a heat pipe (heat exchange) operation mode. In this mode, ventilation air that becomes hot indoors enters the ventilation block 100. The ventilation air is cooled through contact with the evaporation unit (the lower end) of the heat pipe 700 while passing through the second heat exchange block 600, changed into supply air, and then supplied to the indoor through the air supply block 300.

In this case, outside air enters the outside air block 200, and takes the heat of the operating fluid through contact with the condensation unit (the upper end) of the heat pipe 700 while passing through the first heat exchange block 500. Accordingly, the outside air is heated, changed into exhaust air, and discharged to the outside through the air exhaust block 400.

In this case, in the heat pipe 700, the absorption (cooling) and discharge (heating) process of heat are consecutively performed without a separate power source because the heat transfer medium (operating fluid) can move due to a pressure difference between the evaporation unit and the condensation unit in the evaporation process of an operating fluid and the phase change process of condensation.

Figure 5:
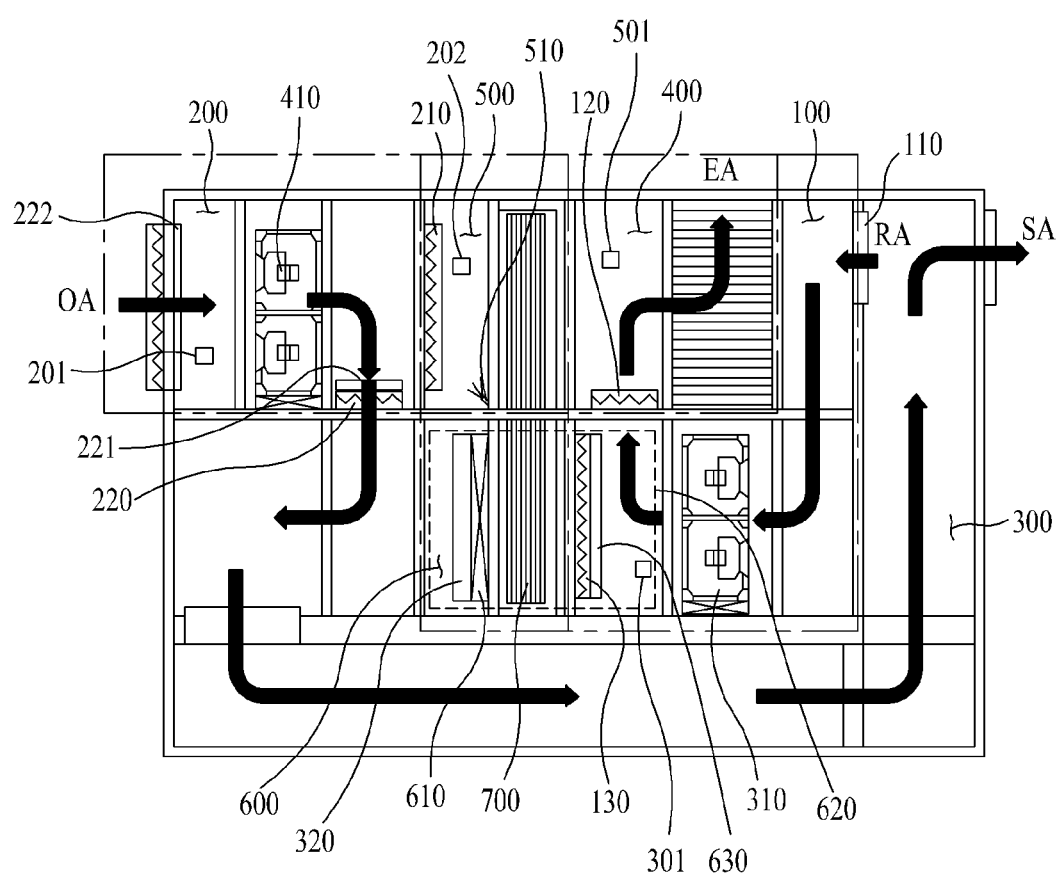
FIG. 5 is an exemplary diagram showing a flow of air though the air-conditioning apparatus of FIG. 3 in a full outside air operation mode according to another embodiment of the present invention.

FIG. 5 shows a flow of air through the air-conditioning apparatus 20 in a full outside air operation mode according to another embodiment of the present invention.

Ventilation air that becomes hot indoors enters the ventilation block 100. Accordingly, when the second air damper 130 is closed and the first air damper 120 is open, the ventilation air is directly discharged to the outside through the air exhaust block 400. Outside air enters the outside air block 200, the third air damper 210 is closed, and the fourth air damper 220 is open. Accordingly, the outside air is provided to the indoor through the air supply block 300 without the intervention of the first or second heat exchange block 500, 600.

Figure 6:
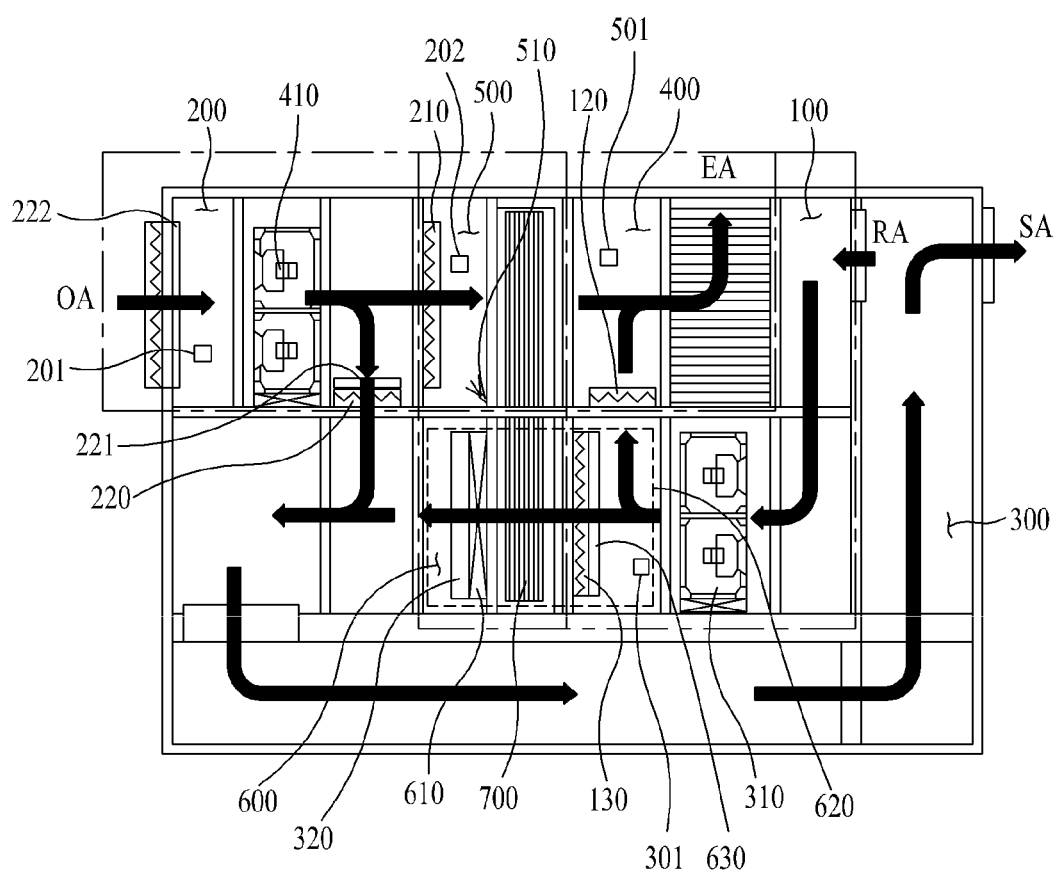
FIG. 6 is an exemplary diagram showing a flow of air through the air-conditioning apparatus of FIG. 3 in a mixing operation mode according to another embodiment of the present invention.

FIG. 6 shows a flow of air through the air-conditioning apparatus 20 in a mixing operation mode according to another embodiment of the present invention. When all of the air dampers included in the air-conditioning apparatus 20 using the heat pipe 700 are open, ventilation air that becomes hot indoors enters the ventilation block 100. The ventilation air is cooled through contact with the evaporation unit (the lower end) of the heat pipe 700 while passing through the second heat exchange block 600, changed into supply air, and supplied indoors again through the air supply block 300.

At this time, some of the ventilation air is directly discharged to the outside through the air exhaust block 400 because the first air damper 120 is open.

Furthermore, outside air enters the outside air block 200. The outside air takes the heat of the operating fluid through contact with the condensation unit (the upper end) of the heat pipe 700 while passing through the first heat exchange block 500, and it is heated, changed into exhaust air, and then discharged to the outside through the air exhaust block 400.

At this time, some of the outside air enters the air supply block 300 without passing through the first heat exchange block 500 because the fourth air damper 220 is open. The outside air is mixed with the supply air, which has been changed from the ventilation air and cooled through contact with the evaporation unit (the lower end) of the heat pipe 700, at a corresponding ratio and is then supplied indoors through the air supply block 300.

Accordingly, if it is difficult to directly introduce outside air depending on the environment condition of the outside air, energy can be reduced through indirect heat exchange. If outside air can be directly introduced, a very effective solution according to an environment can be obtained through direct introduction (pre-cooling).

The heat pipe air-conditioning apparatus using a bypass passage according to the embodiments of the present invention have the following effects.

First, outside air can be used as cooling energy through heat exchange using the heat pipe and upon the heat exchange of the heat pipe, an additional cooling effect can be obtained through evaporation and cooling of the outside air by performing mist spray on the outside air.

Second, the energy necessary for an air-conditioning apparatus operation can be reduced because outside air is supplied as supply air and ventilation air is discharged in a (pre-cooling) condition in which the outside air can be directly used as supply air, and the humidity of a supply air can be controlled by selectively passing the supply air through the cooling coil or bypassing (reheating) the supply air.

Third, the energy for the air-conditioning apparatus can be reduced because the heat exchange and mixed supply of outside air and ventilation air can be effectively performed and energy efficiency can be improved using the evaporation latent heat of water.

Fourth, an efficient operation can be performed, operation costs can be reduced, and financial gains can be obtained because the bypass passage through which a ventilation air can directly move to the air supply block without passing through the cooling coil is used within the second heat exchange block through which the ventilation air passes and a cooling temperature and humidity of a supply air are controlled at a ratio of ventilation air through the cooling coil and ventilation air through the bypass passage.

Although the present invention has been described in connection with the embodiments illustrated in the drawings, the embodiments are only illustrative. Those skilled in the art to which the present invention pertains may understand that various other modifications and equivalent embodiments are possible. Accordingly, the true range of protection of the present invention should be determined by the technological spirit of the following claims.

What is claimed is:

1. A heat pipe air-conditioning apparatus, comprising:
a housing having an interior configured into a plurality of blocks, the plurality of blocks including,
a ventilation block providing a passage for ventilation air introduced from inside of a predetermined structure to flow into the housing;
an air exhaust block having one end connected at a boundary with the ventilation block and providing a passage for the ventilation air from inside of the predetermined structure flowing through the ventilation block to flow through the air exhaust block as exhaust air directly to an outside of housing;
an air supply block providing a passage for supply air supplied from the air supply block to flow into the inside of the predetermined structure;
an outside air block having one end connected at a boundary with the air supply block and providing a passage for outside air introduced from the outside to flow into the air supply block;
a first heat exchange block comprising a condensation unit of a heat pipe and connected to the outside air block, the ventilation block and the air exhaust block, the first heat exchange block being configured to enable ventilation air from inside of the predetermined structure flowing through the ventilation block or outside air from the outside air block through the heat pipe to be changed into exhaust air, and to discharge the changed exhaust air to outside of the housing through the air exhaust block; and
a second heat exchange block comprising an evaporation unit of the heat pipe and connected to the ventilation block, the outside air block and the air supply block, the second heat exchange block being configured to enable ventilation air through the heat pipe from the ventilation block or outside air from outside of the housing through the outside air block to be changed into supply air, to discharge the changed supply air to the air supply block, to selectively mix the ventilation air and the outside air, to change the mixed air into supply air and to discharge the changed supply air to the air supply block;
wherein a bypass passage is disposed within the second heat exchange block and formed on one side of a cooling coil, provided in the second heat exchange block, for cooling ventilation air, the bypass passage being configured to allow the ventilation air to pass therethrough.

2. The heat pipe air-conditioning apparatus of claim 1, wherein:
the second heat exchange block is configured to direct some of ventilation air passing through the second heat exchange block to pass through the cooling coil and some of the ventilation air to bypass the cooling coil through the bypass passage, and
a cooling temperature and humidity of the supply air are controlled at a ratio of the ventilation air passing through the cooling coil and the ventilation air passing through the bypass passage.

3. The heat pipe air-conditioning apparatus of claim 1 further comprising:
a first air damper disposed in the boundary between the ventilation block and the air exhaust block and configured to be selectively opened and closed to control inflow of ventilation air into the air exhaust block; and
second air damper disposed in a boundary between the ventilation block and the second heat exchange block and configured to be selectively opened and closed to discharge ventilation air introduced into the ventilation block to the second heat exchange block.

4. The heat pipe air-conditioning apparatus of claim 1 further comprising:
a first air filter included in an outside air damper provided in an opening through which outside air is introduced and configured to remove alien substances included in the outside air;
a third air damper disposed in a boundary between the outside air block and the first heat exchange block and configured to be selectively opened and closed to discharge the outside air introduced into the outside air block to the first heat exchange block;
a fourth air damper disposed in a boundary between the outside air block and the air supply block and configured to be selectively opened and closed to discharge the outside air introduced into the outside air block into the air supply block;
a second air filter included in the fourth air damper to remove alien substances included in the outside air passing through the fourth air damper;
a first temperature and humidity sensor disposed in the opening through which outside air is introduced from the outside and configured to measure a temperature and humidity of the outside air introduced from the outside to the opening; and
a first temperature sensor disposed in the first heat exchange block to measure a temperature of the outside air passing through the third air damper.

5. The heat pipe air-conditioning apparatus of claim 1, wherein the air supply block comprises:
a first ventilation unit disposed in the air supply block and configured to selectively control a flow velocity of supply air;
a second temperature and humidity sensor disposed within the air supply block to measure a temperature and humidity of the supply air through the first ventilation unit; and
a second temperature sensor disposed in the second heat exchange block to measure a temperature at an exit of the heat pipe.

6. The heat pipe air-conditioning apparatus of claim 5, further comprising a humidification nozzle provided at a front end of the air supply block to selectively spray a mist so that the supply air discharged from the second heat exchange block to the air supply block is humidified.

7. The heat pipe air-conditioning apparatus of claim 1, wherein the air exhaust block comprises:
a second ventilation unit disposed in the air exhaust block and configured to selectively control a flow velocity of exhaust air; and
a third temperature and humidity sensor disposed within the air exhaust block to measure a temperature and humidity of the exhaust air through the second ventilation unit.

8. The heat pipe air-conditioning apparatus of claim 1, further comprising:
a third temperature sensor disposed in the first heat exchange block to measure a temperature of outside air after the outside air has passed through the heat pipe; and
a mist spray nozzle disposed in the first heat exchange block to selectively spray a mist to outside air introduced through the outside air block.

9. The heat pipe air-conditioning apparatus of claim 1, wherein the second heat exchange block comprises:
a fourth temperature sensor configured to measure a temperature of ventilation air before the ventilation air passes through the heat pipe; and
a third air filter disposed upstream of the evaporation unit of the heat pipe to filter alien substances included in the air passing through the heat pipe.

10. A heat pipe air-conditioning apparatus, comprising:
a housing having an interior configured into a plurality of blocks, the plurality of blocks including,
an air supply block providing a passage through which supply air supplied from the air supply block to flow into a predetermined structure;
a ventilation block having a pair of ventilation air inlets disposed on left and right sides of the air supply block, respectively, to provide a passage through which ventilation air introduced from inside of the predetermined structure to flow into the housing;
an air exhaust block connected at a boundary with one side of the ventilation block to provide a passage for the ventilation air from inside of the predetermined structure flowing through the ventilation block to flow through the air exhaust block as exhaust air directly to an outside of the housing;
an outside air block having one end connected at a boundary with the air supply block to provide a passage through which outside air introduced from the outside of the housing to flow into the air supply block;
a first heat exchange block comprising a condensation unit of a heat pipe and connected to the outside air block and the air exhaust block to change outside air introduced through the outside air block into exhaust air by passing the outside air through the heat pipe, and to discharge the changed exhaust air to the outside of the housing through the air exhaust block;
a second heat exchange block comprising an evaporation unit of the heat pipe and connected to the ventilation block and the air supply block to change the ventilation air introduced through the ventilation block into the supply air by passing the ventilation air through the heat pipe, and to discharge the changed supply air to the air supply block; and
a cooling coil disposed behind the heat pipe within the second heat exchange block to selectively cool the ventilation air passing through the second heat exchange block;
wherein a bypass passage is formed in the second heat exchange block on one side of the cooling coil to allow the ventilation air to pass therethrough.

11. The heat pipe air-conditioning apparatus of claim 10, wherein:
the second heat exchange block is configured to direct some of ventilation air passing through the second heat exchange block to pass through the cooling coil and some of the ventilation air to bypass the cooling coil through the bypass passage, and
a cooling temperature and humidity of the supply air are controlled at a ratio of the ventilation air passing through the cooling coil and the ventilation air passing through the bypass passage.

12. The air-conditioning apparatus of claim 10, further comprising:
a first air damper disposed at the boundary between the ventilation block and the air exhaust block, and selectively opened and shut to discharge the ventilation air flowing into the ventilation block to the air exhaust block;

a second air damper disposed at a boundary between ventilation block and the second heat exchange block, and selectively opened and shut to discharge the ventilation air flowing into the ventilation block to the second heat exchange block;

a first air volume measurement sensor disposed within the ventilation block to measure an air volume within the ventilation block; and a first ventilation unit disposed within the ventilation block to selectively control an air volume within the ventilation block.

13. The air-conditioning apparatus of claim 10, further comprising:

a first air filter disposed in an outside air damper disposed in an opening of the outside air block through which outside air is introduced to remove alien substances included in the outside air;

a second ventilation unit disposed within the outside air block to selectively control an air volume of exhaust air;

a fourth air damper disposed at the boundary between the outside air block and the air supply block, and selectively opened and shut to discharge an outside air flowing into the outside air block to the air supply block;

a second air filter disposed in the fourth air damper to remove alien substances included in the outside air through the fourth air damper; and a first temperature/humidity sensor provided in the outside air block near the opening of the outside air block to measure a temperature and humidity of the outside air introduced through the opening from the outside of the housing.

14. The air-conditioning apparatus of claim 10, further comprising:

a third air damper disposed at a boundary between the outside air block and the first heat exchange block and selectively opened and shut to discharge outside air flowing into the outside air block to the first heat exchange block; and a first temperature sensor disposed in the first heat exchange block near the third air damper to measure a temperature of outside air after the outside air passes through the third air damper.

15. The air-conditioning apparatus of claim 10, further comprising:

a third air filter disposed at a boundary between the second heat exchange and the ventilation block to filter alien substances included in the ventilation air passing through the heat pipe;

wherein the cooling coil disposed behind the evaporation unit of the heat pipe to selectively cool the ventilation air passing through the heat pipe; and a humidifier is disposed in the second heat exchange block behind the cooling coil to selectively humidify the cooled ventilation air drained into the air supply block.

* * * * *